Dec. 22, 1931. M. M. POWERS 1,837,583
MEANS FOR MOVING STALLED AUTOMOBILES AND THE LIKE
Filed Sept. 26, 1929
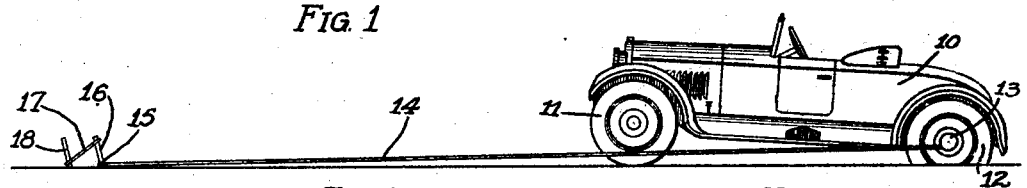
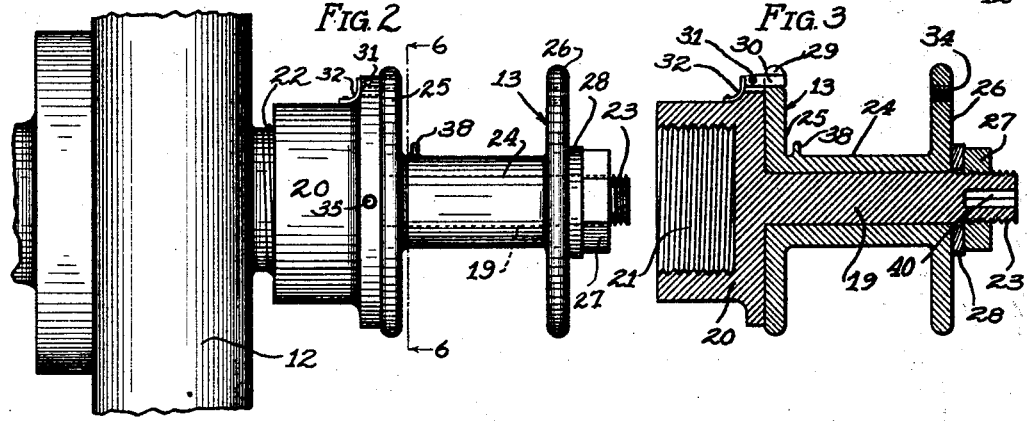
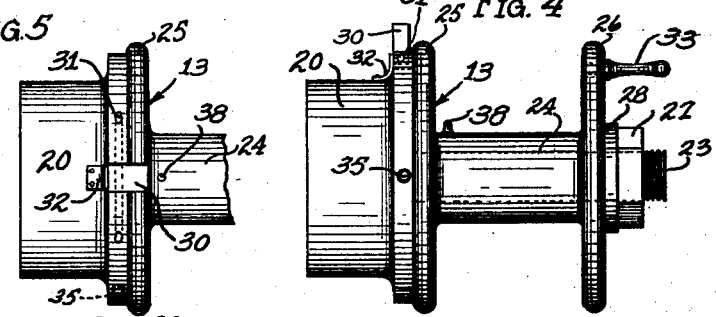
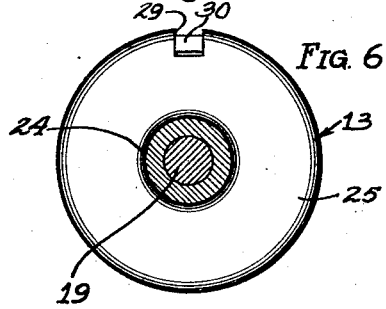
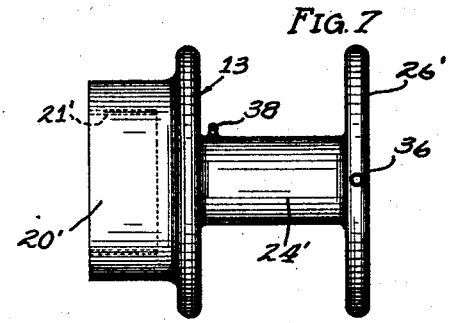
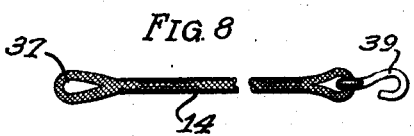
WITNESSES:
R. A. Larsson
F. C. Appleton
INVENTOR:
MICHAEL M. POWERS,
By Joshua R H Folk
HIS ATTORNEY Patented Dec. 22, 1931

1,837,583

UNITED STATES PATENT OFFICE

MICHAEL M. POWERS, OF CHICAGO, ILLINOIS

MEANS FOR MOVING STALLED AUTOMOBILES AND THE LIKE

Application filed September 26, 1929. Serial No. 395,236.

This invention relates to means for moving stalled automobiles and the like. It has for its principal object to provide a simple and practical device whereby the vehicle may be pulled, under its own power, out of mud or snow, or along a wet or very slippery surface, where the driving wheels will not take hold with sufficient tractive effect to propel the car in the regular way. Other objects and advantages to be attained will hereinafter more fully appear.

The invention consists in the novel structural arrangements of a winding device adapted to be driven by the driving axle, and preferably, having provision for detachably securing it for this purpose directly to the hub portion of the driving wheel, said device also having, preferably, provision for the attachment thereto of small tools such as drills, saws, or other rotary cutters, grinding wheels and the like, all as hereinafter described and pointed out with particularity in the appended claims.

In the accompanying drawings illustrating a practical adaptation of the invention, Fig. 1 is a view, more or less diagrammatic, showing the invention as applied to an automobile whose rear wheels are represented as being mired;

Fig. 2 is a fragmentary view, on an enlarged scale, showing the winding device as attached to the hub of an automobile wheel;

Fig. 3 is a longitudinal section through the winding device detached;

Fig. 4 is a side elevation of the winding device detached, the drum member being unlatched with respect to the spindle member and having a handle applied thereto for rotating it about said spindle member;

Fig. 5 is a fragmentary view illustrating in detail the means for latching the spindle and drum members together;

Fig. 6 is a section taken on or about line 6—6 of Fig. 2;

Fig. 7 is a side elevation of a modification of the winding device; and

Fig. 8 is a fragmentary view illustrating the arrangement of the opposite end portions of the cable which is used in connection with the winding device.

Referring now to the drawings, the numeral 10 designates the body of an ordinary automobile whose front wheels 11 are represented as being supported on the road surface, and whose rear wheels 12 are represented as being mired or sunken below the road surface.

Attached to the hub of the left rear wheel is a winding device 13 to be presently described in detail, said winding device having one end of a cable 14 attached thereto so as to be wound thereon, and the opposite end of said cable being attached, as at 15, to a stake 16, which latter is represented as being driven into the ground, and has its upper end portion braced by a diagonal stay 17 which is attached to a second stake 18. Obviously, by the foregoing arrangement, the cable 14 will be wound upon the winding device 13 under the power of the motor of the automobile, whereby the automobile will be drawn towards the anchorage of said cable 14.

In the preferred embodiment of the invention, the winding device 13 comprises a spindle member 19 having an enlargement or head portion 20 at one end, which is provided with an axial socket 21, said socket being provided with screw threads that are a counterpart of the screw threaded hub portion 22 of the driving wheel 12, the opposite end portion of said spindle member 19 being screw threaded as at 23.

The spindle member 19 is adapted to receive thereon a cylindrical winding member or drum 24 having end flanges 25 and 26, respectively. The member 24 is detachably secured on said member 19 by a nut 27, which is applied to the screw threaded end portion 23 of the member 19, there being preferably a washer 28 interposed between said nut 27 and the adjacent end of said member 24. In order to more securely interlock said spindle member 19 and winding drum 24, the flange 25 at the inner end of said member 24 is preferably provided with a peripheral notch 29 for the reception of a latch member 30, which is pivotally mounted, as at 31, in a peripheral notch provided therefor in the adjacent head portion 20 of said spindle 19.

Preferably, a leaf spring 32 is provided on the head portion 20 of said spindle member 19 so as to yieldably engage the squared adjacent end portion and side face of said latch member 30, whereby to releasably hold said latch member either in its locking position with respect to the flange 25 of said member 24, as shown more clearly in Fig. 3 of the drawings, or in its unlocked position as shown more clearly in Fig. 4 of the drawings.

To apply the device to the hub of the automobile wheel 12, it is only necessary to remove the hub cap and screw the head portion 20 of the spindle member 19 onto the hub 22 of the wheel. Obviously, in cases where all of the hubs are provided with right hand screw threads, the winding device will be placed on the hub of the wheel at the left hand side of the machine, provided it is desired to move the automobile forwardly, whereas, if it is desired to move the automobile rearwardly, the winding device will be placed on the hub of the wheel at the right hand side of the machine, and the cable 14 is accordingly anchored in front of or to the rear of the machine, as the case may be.

After the machine has been moved onto solid ground whereby it may be propelled under its own power as under normal conditions, and it is desired to wind the unused portion of the cable 14 on the winding device, this may be readily accomplished by loosening the nut 27 and releasing the latch member 30 from the notch 29 in the flange 25 of said winding drum 24, and applying a handle member 33 to the flange 26 of said drum 24 so as to rotate the drum on the spindle member 19. Preferably, the flange 26 is provided with a threaded aperture 34 to receive the correspondingly threaded end portion of said handle member 33. It is also preferable to provide a threaded opening 35 in the peripheral portion of the head 20 of said spindle member 19, in which opening 35 said handle member 33 is also adapted to be received. This latter provision is to facilitate the removal of the spindle member from the hub of the wheel.

While it is preferable to provide a winding device including separate spindle and drum members 19 and 24, respectively, in some cases it may be desired to have an integral structure in which the winding drum 24' is provided with a socketed head portion 20' for its attachment to the hub of the wheel. In this modification an aperture 36 is provided in the outer flange 26' of the drum for the attachment of the handle 33.

The cable 14 is preferably provided with a loop or eye 37 at its end, which is attached to the drum 24 or 24', as the case may be, said drum being provided with a stud 38 over which the looped portion or eye 38 of the cable is detachably engaged. The opposite end of the cable is preferably provided with a hook 39 for detachably securing it to the stake 15 or other anchorage.

As illustrated in Fig. 3 of the drawings, the spindle member 19 may be provided in its outer end portion with an axial socket 40 of suitable character to receive the shank portion of a drill bit or boring tool, or other rotary tool usually applied to a chuck. Obviously, also, pulleys for driving belts, grinding wheels and other useful rotary appliances may be secured on said spindle member 19 in place of the winding drum 24. In this utilization of the device, of course, the driving wheel 12 on which the winding device is attached, will be raised above the surface on which the automobile is supported, and the other wheels blocked so as to prevent movement of the car. This is an advantage in the utility of the device in addition to the use for which it is principally provided, as hereinabove first set forth.

Obviously the device admits of considerable modification without departing from the spirit and scope of the invention as defined by the appended claims. The invention, therefore, is not limited to the specific construction and arrangement shown in the drawings.

Having described my invention, what I claim as new and desire to secure by Letters Patent is:

1. Means for moving a stalled automobile or the like, comprising a winding device including a spindle member having provision for its attachment axially to the hub portion of a driving wheel, a winding drum fitted rotatably on said spindle member and a peripherally disposed latch element for releasably interlocking said spindle member and said winding drum rotatively.

2. Means for moving a stalled automobile or the like, comprising a spindle member having a screw threaded axial socket portion at the end thereof, adapted to be detachably secured on the screw threaded hub portion of an automobile wheel in place of the hub cap, a winding drum sleeved on said spindle member, said winding drum having opposite end flanges, a latch element releasably engageable in registered notches provided therefor in said spindle member and an adjacent end flange of said drum respectively, and means cooperating with the outer end portion of said spindle member and the adjacent end portion of said drum whereby to hold said members against relative endwise movement.

3. In a device of the character described, a spindle member attachable to the driving axle of an automobile or the like to rotate axially therewith, a supplemental rotatable element sleeved on said spindle member, means for releasably securing said supplemental element against endwise movement on said spindle member, a latch element movably mounted on a peripheral portion of said spindle member and engageable in a notch provided therefor in an adjacent peripheral portion of said supplemental element whereby to releasably interlock said spindle member and supplemental element rotatively, and means for yieldably holding said latch element in opened and closed positions.

4. In a device of the character described, a spindle member, a supplemental rotatable element sleeved on said spindle member, and means for interlocking said spindle member and said supplemental element rotatively, said means comprising a latch element pivotally mounted in a peripheral notch in said spindle member and movable into a cooperating notch provided therefor in an adjacent peripheral portion of said supplemental element, said latch element having right angular faces adjacent to its pivotal axis and a cooperating spring element engageable with said right angular faces for yieldably holding said latch element respectively in closed and opened positions.

In testimony whereof I have signed my name to this specification.

MICHAEL M. POWERS.